United States Patent
Shih et al.

(10) Patent No.: US 9,584,717 B2
(45) Date of Patent: Feb. 28, 2017

(54) FOCUSING METHOD, AND IMAGE CAPTURING DEVICE FOR IMPLEMENTING THE SAME

(71) Applicant: LITE-ON TECHNOLOGY CORP., Taipei (TW)

(72) Inventors: Ming-Huang Shih, New Taipei (TW); Jau-Yu Chen, Taipei (TW); Hsing-Hung Chen, Yilan County (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 14/950,119

(22) Filed: Nov. 24, 2015

(65) Prior Publication Data
US 2016/0360092 A1    Dec. 8, 2016

(30) Foreign Application Priority Data
Jun. 4, 2015  (CN) .......................... 2015 1 0304616

(51) Int. Cl.
*H04N 5/232*    (2006.01)
*H04N 5/225*    (2006.01)

(52) U.S. Cl.
CPC ........ *H04N 5/23212* (2013.01); *H04N 5/2253* (2013.01); *H04N 5/2254* (2013.01)

(58) Field of Classification Search
CPC .................................................. H04N 5/23212
USPC .................................................. 348/345, 349
See application file for complete search history.

(56) References Cited

U.S. PATENT DOCUMENTS

| | | | |
|---|---|---|---|
| 2013/0033579 A1* | 2/2013 | Wajs ...................... | G02B 7/365 348/46 |
| 2013/0113988 A1* | 5/2013 | Wajs ...................... | H04N 5/225 348/362 |
| 2015/0326772 A1* | 11/2015 | Kazami ................ | H04N 5/2352 348/252 |
| 2016/0165126 A1* | 6/2016 | Mishima ............ | H04N 5/23212 382/255 |
| 2016/0255323 A1* | 9/2016 | Wajs ...................... | G06T 7/0051 |

* cited by examiner

*Primary Examiner* — Anthony J Daniels
(74) *Attorney, Agent, or Firm* — Rosenberg, Klein & Lee (57) ABSTRACT

A focusing method includes the steps of calculating a diameter difference between a first circle of confusion diameter and a second circle of confusion diameter which correspond respectively to first image data and second image data associated respectively with light energy of a first spectrum and light energy of a second spectrum, generating a control signal associated with a target image distance according to an initial image distance, the diameter difference, and a lookup table, driving movement of a lens module so as to change a distance between the lens module and an image sensor from the initial image distance into the target image distance according to the control signal.

12 Claims, 4 Drawing Sheets

FOCUSING METHOD, AND IMAGE CAPTURING DEVICE FOR IMPLEMENTING THE SAME

CROSS-REFERENCE TO RELATED APPLICATION

This application claims priority of Chinese Patent Application No. 201510304616.2, filed on Jun. 4, 2015.

FIELD

The disclosure relates to a focusing method and an image capturing device for implementing the same, more particularly to a focusing method and an image capturing device capable of fast focus.

BACKGROUND

A conventional focusing method is adapted for an image capturing device provided in a mobile device, such as a cell phone or a tablet computer. The image capturing device includes an image sensor, a lens module, a focus driver and a processor module. The focusing method is implemented through the adoption of contrast detection technology. The processor module first receives image data which is generated by the image sensor that detects an image of an object. The processor then obtains contrast of image data according to the image data received from the image sensor. The focus driver is controlled to drive movement of the lens module for controlling a distance between the lens module and the image sensor, so as to obtain image data having relative maximum contrast. Based on the conventional focusing method, if a distance between the object and the lens module is very small, such as smaller than 30 centimeters, in order to obtain the image data with relative maximum contrast, the lens module which is driven by the focus driver is required to be moved repeatedly. In this way, a longer focusing time is needed, and higher power consumption is inevitable.

SUMMARY

Therefore, an object of the disclosure is to provide a focusing method and an image capturing device capable of fast focus.

According to a first aspect of the disclosure, the focusing method is to be implemented by an image capturing device. The image capturing device includes an image sensor, a lens module movable relative to the image sensor, a focus driver for driving movement of the lens module, and a processor module connected electrically to the image sensor and the focus driver. The lens module includes a first diaphragm and a second diaphragm different from the first diaphragm. The focusing method includes the steps of:

detecting simultaneously, by the image sensor, light energy of a first spectrum and light energy of a second spectrum which are associated with an image containing an object when the lens module is located at an initial position, for respective generation of a first image data corresponding to the light energy of the first spectrum and a second image data corresponding to the light energy of the second spectrum, each of the first image data and the second image data being associated with a respective one of the first diaphragm and the second diaphragm, a distance between the lens module which is located at the initial position and the image sensor being defined as an initial image distance;

obtaining, by the processor module according to the first image data and the second image data, a first circle of confusion diameter and a second circle of confusion diameter which are associated with the object and which correspond respectively to the first image data and the second image data;

calculating, by the processor module, a diameter difference between the first circle of confusion diameter and the second circle of confusion diameter;

generating, by the processor module, a control signal associated with a target image distance at least according to the initial image distance, the diameter difference, and a lookup table which contains information of at least one image distance and at least one corresponding difference between circle of confusion diameters; and driving, by the focus driver according to the control signal, movement of the lens module so as to change the distance between the lens module and the image sensor from the initial image distance into the target image distance.

According to a second aspect of the disclosure, the image capturing device includes an image sensor, a lens module which is movable relative to the image sensor and which includes a first diaphragm and a second diaphragm different from the first diaphragm, a storage module which stores a lookup table that contains information of at least one image distance and at least one corresponding difference between circle of confusion diameters, a focus driver for driving movement of the lens module, and a processor module which is coupled electrically to the image sensor, the focus driver and the storage module and which controls the driver module.

The image sensor detects simultaneously light energy of a first spectrum and light energy of a second spectrum which are associated with an image containing an object when the lens module is located at an initial position, for respective generation of a first image data corresponding to the light energy of the first spectrum and a second image data corresponding to the light energy of the second spectrum. Each of the first image data and the second image data being associated with a respective one of the first diaphragm and the second diaphragm. A distance between the lens module which is located at the initial position and the image sensor being defined as an initial image distance.

The processor module receives the first image data and the second image data from the image sensor, obtains, according to the first image data and the second image data, a first circle of confusion diameter and a second circle of confusion diameter which are associated with the object and which correspond respectively to the first image data and the second image data, and calculates a diameter difference between the first circle of confusion diameter and the second circle of confusion diameter.

The processor module generates a control signal associated with a target image distance at least according to the initial image distance, the diameter difference and the lookup table, and outputs the control signal to the focus driver, so that the focus driver drives, according to the control signal received from the processor module, movement of the lens module so as to change the distance between the lens module and the image sensor from the initial image distance into the target image distance.

An effect of the disclosure resides in that, by means of the processor module which calculates the diameter difference between the first circle of confusion diameter and the second circle of confusion diameter according to the first and second image data and which generates the control signal associated with the target image distance according to the initial image distance, the diameter difference and the lookup table, fast focus may be realized when the distance between the object and the lens module is very short.

BRIEF DESCRIPTION OF THE DRAWINGS

Other features and advantages of the disclosure will become apparent in the following detailed description of an embodiment with reference to the accompanying drawings, of which.

DETAILED DESCRIPTION

Figure 1:
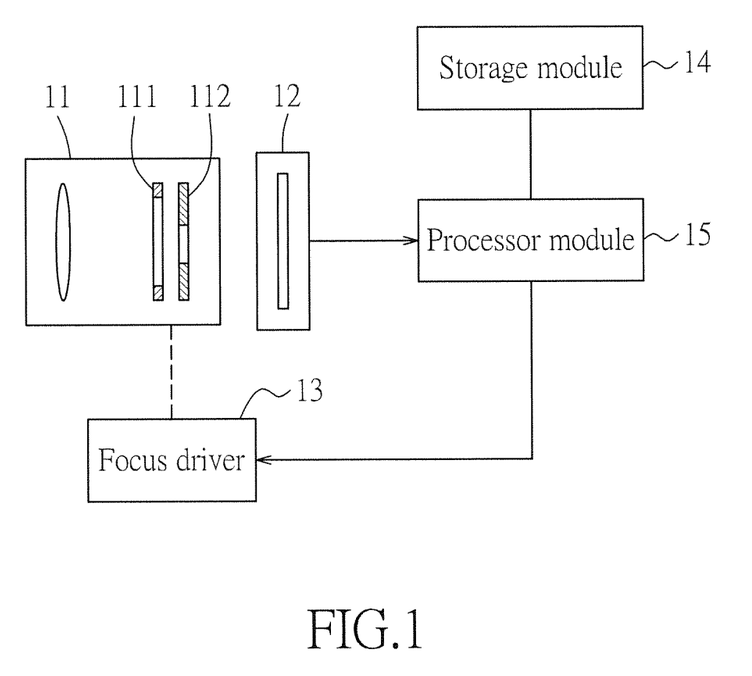
FIG. 1 is a block diagram illustrating an embodiment of an image capturing device according to the disclosure.

Referring to FIG. 1, an embodiment of an image capturing device according to the disclosure includes an image sensor 12, a lens module 11 which is movable relative to the image sensor 12, a storage module 14 which stores a lookup table that contains information of at least one image distance and at least one corresponding difference between circle of confusion diameters, a focus driver 13 which is adapted for driving movement of the lens module 11, and a processor module 15 which is connected electrically to the image sensor 12, the focus driver 13 and the storage module 14, and which controls the focus driver 13.

The lens module 11 includes a first diaphragm 111 and a second diaphragm 112 which is different from the first diaphragm ill and which is coaxially arranged with respect to the first diaphragm 111. It is noted that, in this embodiment, since the image capturing device is applicable to a mobile device, such as a cell phone or a tablet computer, the first diaphragm 111 and the second diaphragm 112 respectively have unadjustable f-numbers. Moreover, the focus driver 13 is exemplified as a voice coil motor (VCM) module which is usually adopted in a camera unit of a cell phone. The VCM module, by virtue of changing a magnitude of a driving current, drives movement of the lens module 11 so as to change an image distance between the lens module 11 and the image sensor 12. In other embodiments where the image capturing device may be applicable to another device, such as a camera or a video camera, the first diaphragm 111 and the second diaphragm 112 may respectively have adjustable f-numbers.

Figure 2:
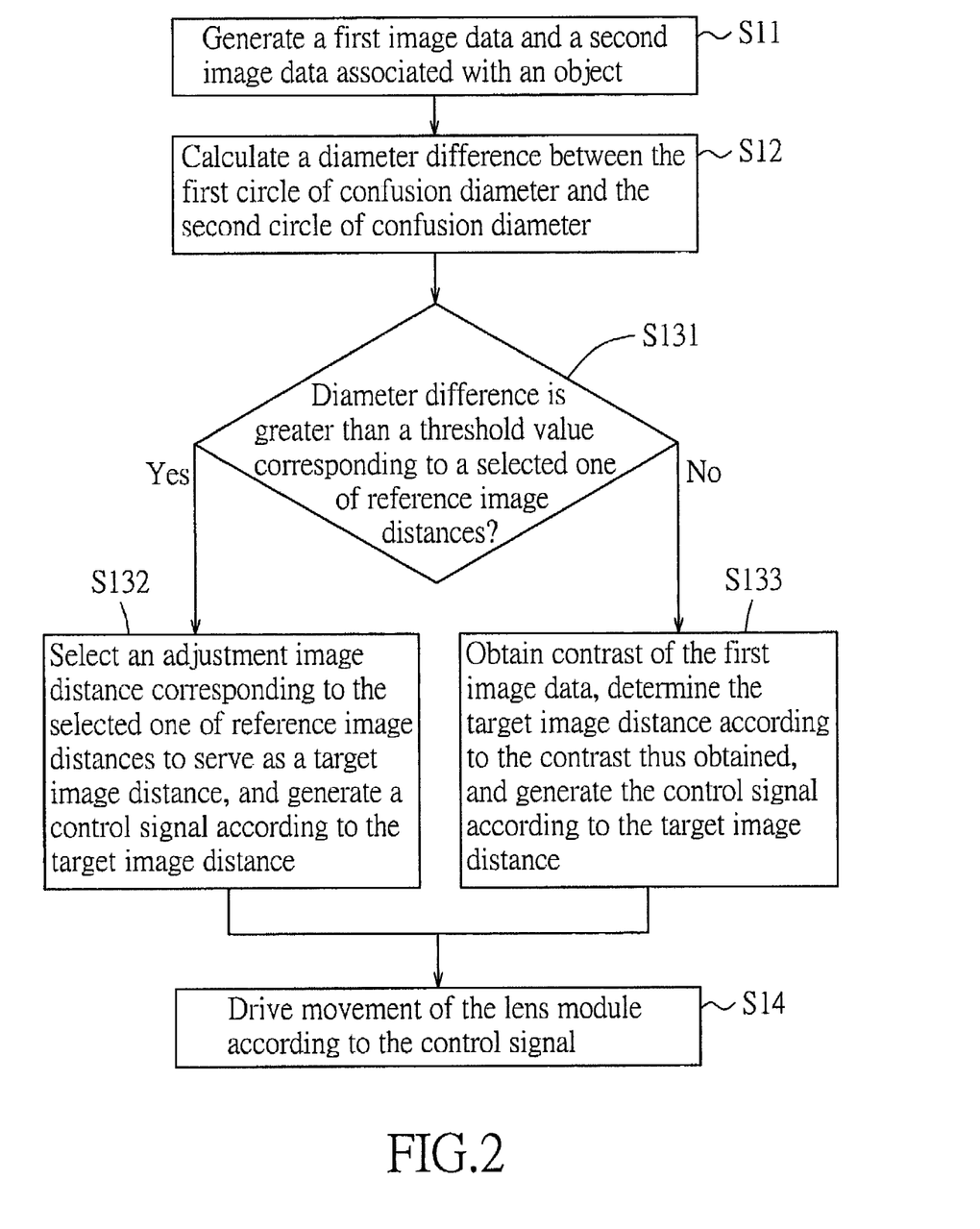
FIG. 2 is a flow chart illustrating steps of a focusing method implemented by the embodiment of the image capturing device according to the disclosure.

Referring to FIG. 1 and FIG. 2, FIG. 2 is a flowchart illustrating steps of a focusing method implemented by the embodiment of the image capturing device according to the disclosure.

In step S11, the image sensor 12 detects simultaneously light energy of a first spectrum and light energy of a second spectrum which are associated with an image containing an object when the lens module 11 is located at an initial position, for respective generation of a first image data corresponding to the light energy of the first spectrum and a second image data corresponding to the light energy of the second spectrum. Each of the first image data and the second image data is associated with a respective one of the first diaphragm 111 and the second diaphragm 112. A distance between the lens module 11 which is located at the initial position and the image sensor 12 is defined as an initial image distance.

In this embodiment, an aperture of the first diaphragm 111 is greater than an aperture of the second diaphragm 112. The light energy of the first spectrum corresponds to light energy of a visible light spectrum, and the light energy of the second spectrum corresponds to light energy of an infrared light spectrum.

Referring once again to FIG. 1, a light beam reflected by the object first passes through the larger aperture of the first diaphragm 111 and then the smaller aperture of the second diaphragm 112, and finally reaches the image sensor 12. A material of the first diaphragm 111 blocks light energy of the visible light spectrum and light energy of the infrared light spectrum, and therefore allows passage of the light beam having light energy of the visible light spectrum and light energy of the infrared light spectrum only through the larger aperture of the first diaphragm 111. A material of the second diaphragm 112 blocks light energy of the infrared light spectrum but permits light energy of the visible light spectrum, and therefore allows passage of a portion of the light beam having light energy of the infrared light spectrum through the smaller aperture of the second diaphragm 112 while allowing passage of another portion of the light beam, which has passed through the larger aperture of the first diaphragm 111 and which has light energy of the visible light spectrum, through the second diaphragm 112 and also through the smaller aperture thereof.

Referring to FIG. 1 and FIG. 2, in step S12, the processor module 15 obtains, according to the first image data and the second image data, a first circle of confusion diameter and a second circle of confusion diameter which are associated with the object and which correspond respectively to the first image data and the second image data. The processor module 15 subsequently calculates a diameter difference between the first circle of confusion diameter and the second circle of confusion diameter.

Figure 3:
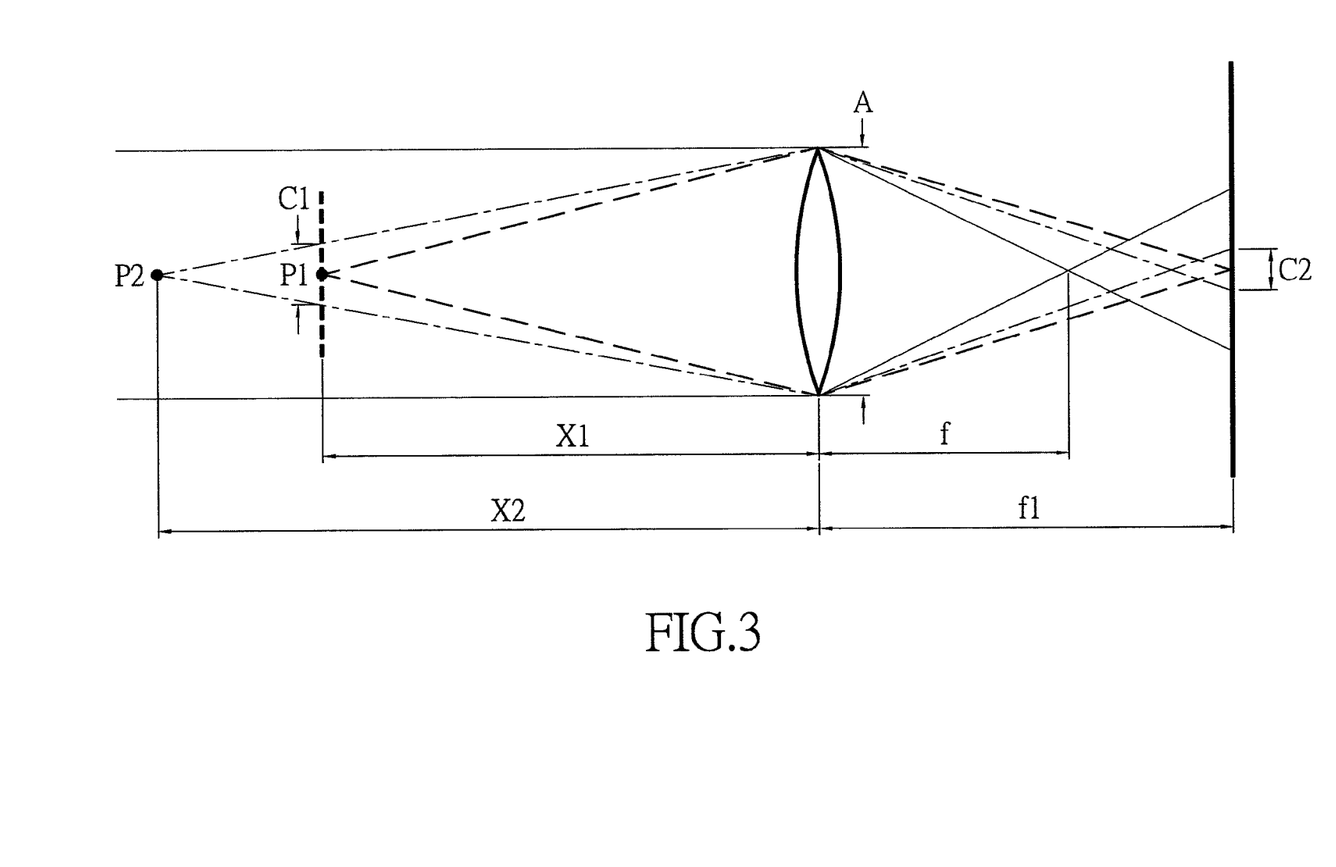
FIG. 3 is a schematic diagram illustrating definition of a circle of confusion in the embodiment according to the disclosure.

Referring to FIG. 3, a schematic diagram illustrates a scenario where a light beam emitted from a point light source passes through a lens and forms an image on an imaging plane for explaining a definition of a circle of confusion. When the point light source is located at a position (P1) and a clear image, i.e., one point, is formed on the imaging plane, a distance between the point light source and the lens is an object distance (X1), and a distance between the lens and the imaging plane is an image distance (f1). At this moment, a diameter of a circle of confusion of the clear image is substantially zero, that is to say, the object distance (X1) is an in-focus object distance. When the point light source is located at a position (P2) and an image of a circle is formed on the imaging plane, a distance between the point light source and the lens is an object distance (X2). At this moment, a circle of confusion diameter, i.e., a diameter of the circle in the image, is denoted as (C2).

According to an optical formula, a relationship among a focal length (f) of the lens, an aperture diameter (A) of the lens, an f-number (N) (i.e., a focal ratio) of the lens, the object distance (X1), the object distance (X2) and the circle of confusion diameter (02) is represented as follows:

$$C2 = \frac{|X2 - X1|}{X2} \frac{f^2}{N(X1-f)},$$

in which $$N = \frac{f}{A}.$$

In this embodiment, under a condition that the focal length and the image distance of the lens module 11 are already known, and that the aperture of the first diaphragm 111 is different from the aperture of the second diaphragm 112, i.e., different f-numbers, the circle of confusion diameter calculated by the processor module 15 is equal to zero only when clear and correct focus occurs, that is, an image of the object is sharp and not blurred.

Figure 4:
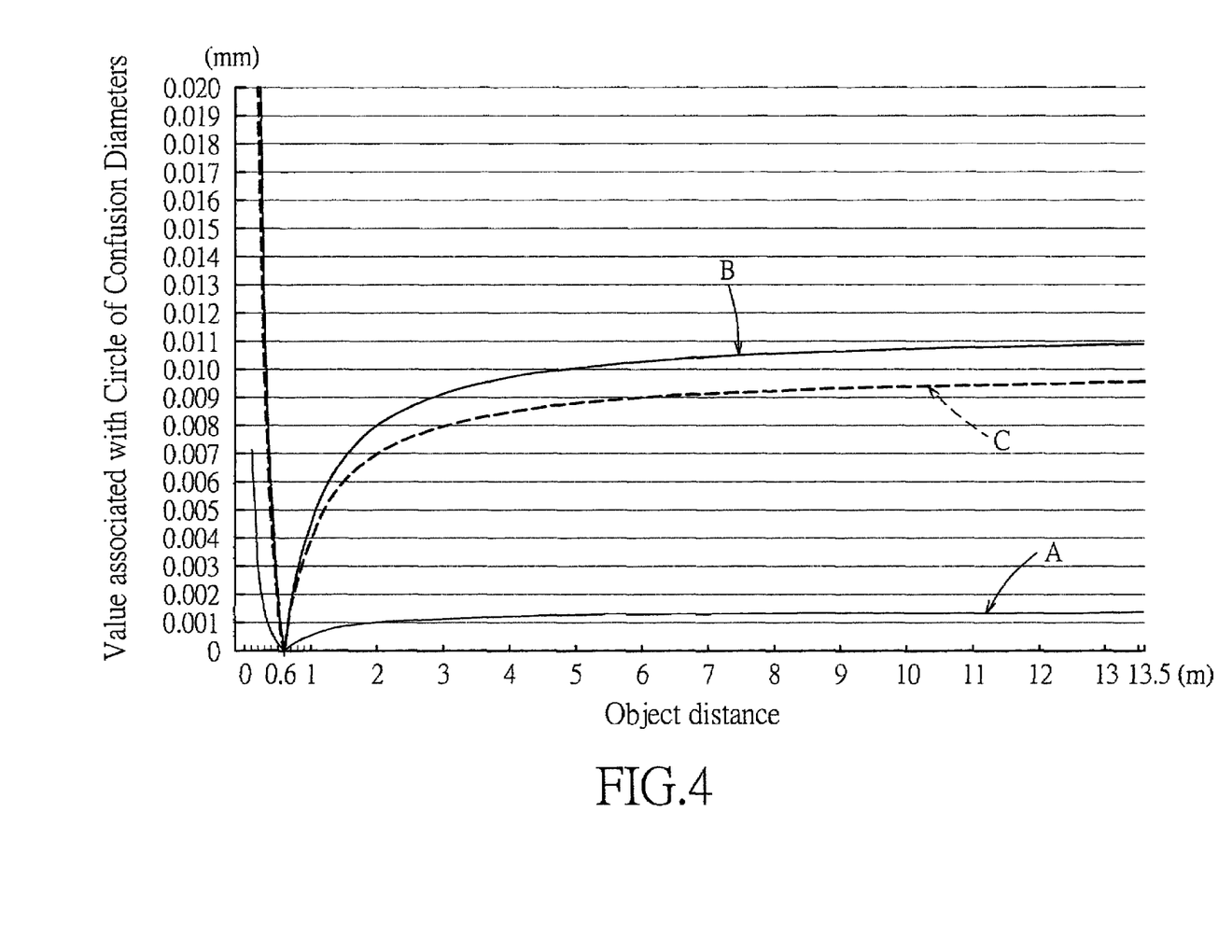
FIG. 4 illustrates a relationship between object distance and a difference between circle of confusion diameters.

Referring to FIG. 4, a relationship between an object distance that is between a point light source and the lens module 11, and a difference that is between the first circle of confusion diameter and the second circle of confusion diameter is illustrated (see curve (C)) when the distance between the lens module 11 and the image sensor 12, i.e., the image distance, is fixed. The transverse axis of FIG. 4 represents the object distance and has a unit of meter (m). The longitudinal axis of FIG. 4 represents the difference between the (first and second) circle of confusion diameters and has a unit of millimeter (mm). In this instance, the lens module 11 has the focal length of 3.69 millimeters, the f-number of the first diaphragm 111 is 2, and the f-number of the second diaphragm 112 is 16. Each of the curves (A) and (B) represents a relationship between the object distance and the circle of confusion diameter when the f-numbers are respectively 16 and 2 according to the aforementioned optical formula. It is evident from this relationship that, when the object distance is 0.6 meters, the difference between the circle of confusion diameters is zero, and an in-focus status is achieved. As the object distance increases from 0.6 meters, the difference between the circle of confusion diameters becomes larger and finally approaches a limit value. As the object distance decreases from 0.6 meters, the difference between the circle of confusion diameters becomes much larger, and a rate of change of the difference is far greater than that when the object distance is increased from 0.6 meters.

The storage module 14 stores the lookup table which contains K numbers of different reference image distances, K numbers of threshold values for differences between circle of confusion diameters corresponding respectively to the K numbers of reference image distances, and K numbers of adjustment image distances corresponding respectively to the K numbers of reference image distances, in which K is an integer. Each of the threshold values for differences between circle of confusion diameters contained in the lookup table is obtained under the condition that the distance between the lens module 11 and the image sensor 12 is equal to the corresponding one of the reference image distances and that a distance between the object and the lens module 11 is equal to a predetermined object distance.

For the sake of convenience, K=1 is given as an example in combination with the aforementioned instance for explanation of the lookup table. An image distance between the lens module 11 and the image sensor 12 when a driving current of the VCM module is zero is selected to exemplify the reference image distance. The corresponding threshold value for difference between circle of confusion diameters is selected to be a difference between the first circle of confusion diameter and the second circle of confusion diameter obtained by the processor module 15 according to the first image data and the second image data when the distance between the object and the lens module 11, i.e., the predetermined object distance, is far greater than the in-focus object distance. When the distance between the object and the lens module 11 is equal to the in-focus object distance, and when the distance between the lens module 11 and the image sensor 12 is equal to the reference image distance, a corresponding difference between circle of confusion diameters is equal to zero. The corresponding adjustment image distance will be explained later.

Referring once again to FIG. 4, for example, when the predetermined object distance is not smaller than twenty-two times the in-focus object distance of the lens module 11, the predetermined object distance may be regarded as far greater than the in-focus object distance. When the predetermined object distance is exemplified as 13.2 meters, the difference between circle of confusion diameters is 0.00954 millimeters, and this 0.00954-millimeter value is taken as the threshold value for difference between circle of confusion diameters. It is evident from the curve (C) that when the distance between the object and the lens module 11 is smaller than 0.6 meters and is equal to a near object distance with the near object distance being, for example, the near object distance being 0.3069 meters in this embodiment, the difference between circle of confusion diameters is equal to the threshold value, i.e., 0.00954 millimeters.

Referring to FIG. 1 and FIG. 2, in step S131, the processor module 15 selects from the lookup table one of the K numbers of reference image distances that is equal to the initial image distance (i.e., a selected one of the K numbers of reference image distances). The processor module 15 subsequently determines whether the diameter difference thus calculated in step S12 is greater than one of the threshold values that corresponds to the selected one of the K numbers of reference image distances. Following the aforementioned instance for explanation, when the initial image distance and the reference image distance are both assumed to be 3.713 millimeters, the corresponding threshold value for difference between circle of confusion diameters is 0.00954 millimeters.

In step S132, when it is determined in step S131 that the diameter difference thus calculated in step S12 is greater than said one of the threshold values, the processor module 15 selects one of the adjustment image distances that corresponds to the selected one of the K numbers of reference image distances contained in the lookup table to serve as a target image distance, and generates a control signal according to the target image distance. Following the aforementioned instance for explanation, the diameter difference is assumed to be 0.05 millimeters. Referring once again to FIG. 4, it is evident from curve (C) that the distance between the object and the lens module 11 must be smaller than the near object distance, i.e., smaller than 0.3069 meters if the diameter difference is greater than the threshold value for difference between circle of confusion diameters (0.05>0.00954).

It is noted that, in this embodiment, the adjustment image distance may be calculated in advance according to the following formula (1):

$$\frac{1}{u} + \frac{1}{v} = \frac{1}{f}, \tag{1}$$

in which u represents the object distance and v represents the image distance. By substituting f with 3.69 millimeters and u with the near object distance, 0.3069 meters, in the formula (1), the image distance of 3.735 millimeters is obtained, and is adopted to serve as the adjustment image distance to be stored in the storage module 14. In other embodiments, a value of the adjustment image distance is associated with but not necessarily equal to a value of the image distance obtained from the formula (1). For example, the adjustment image distance may be 3.730 millimeters, and is slightly smaller than the image distance thus calculated from the formula (1).

In step S133, when it is determined in step S131 that the diameter difference thus calculated is not greater than said one of the threshold values, the processor module 15 obtains contrast of the first image data, determines the target image distance according to the contrast thus obtained, and generates the control signal according to the target image distance.

In step S14, the focus driver 13, according to the control signal, drives movement of the lens module 11 so as to change the distance between the lens module 11 and the image sensor 12 from the initial image distance into the target image distance.

More specifically, when the diameter difference is greater than the threshold value for difference between circle of confusion diameters, it means that the distance between the object and the lens module 11 is very short, i.e., smaller than the near object distance. The focus driver 13, according to the control signal, is able to directly drive movement of the lens module 11 so as to straightforwardly change the initial image distance to the target image distance. In this way, compared with the conventional contrast detection technology, the lens module 11 may be rapidly moved to the target image distance with respect to the image sensor 12 which is close to the in-focus image distance. On the other hand, when the diameter difference is not greater than the threshold value, it means that the distance between the object and the lens module 11 is not very short, and in such case the processor module adopts the conventional contrast detection technology for implementing focusing operation.

It is noted that, in this embodiment, K=1 is given as an example for explaining that the focusing operation is performed in an initial state where the driving current of the VOM module is zero. However, in other embodiments, K may be greater than 1 so that fast focus may be achieved under different conditions for the initial distance.

To sum up, the processor module 15 first calculates the diameter difference between the first circle of confusion diameter and the second circle of confusion diameter according to the first image data and the second image data corresponding to different apertures, and then generates the control signal associated with the target image distance at least according to the initial image distance, the diameter difference and the lookup table. Thereby, an effect of fast focus may be achieved when the distance between the object and the lens module 11 is very short.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A focusing method to be implemented by an image capturing device, the image capturing device including an image sensor, a lens module that is movable relative to the image sensor, a focus driver that is for driving movement of the lens module, and a processor module that is connected electrically to the image sensor and the focus driver, the lens module including a first diaphragm and a second diaphragm different from the first diaphragm, the focusing method comprising the steps of:
    detecting simultaneously, by the image sensor, light energy of a first spectrum and light energy of a second spectrum which are associated with an image containing an object when the lens module is located at an initial position, for respective generation of a first image data corresponding to the light energy of the first spectrum and a second image data corresponding to the light energy of the second spectrum, each of the first image data and the second image data being associated with a respective one of the first diaphragm and the second diaphragm, a distance between the lens module which is located at the initial position and the image sensor being defined as an initial image distance;
    obtaining, by the processor module according to the first image data and the second image data, a first circle of confusion diameter and a second circle of confusion diameter which are associated with the object and which correspond respectively to the first image data and the second image data;
    calculating, by the processor module, a diameter difference between the first circle of confusion diameter and the second circle of confusion diameter;
    generating, by the processor module, a control signal associated with a target image distance at least according to the initial image distance, the diameter difference, and a lookup table which contains information of at least one image distance and at least one corresponding difference between circle of confusion diameters; and
    driving, by the focus driver according to the control signal, movement of the lens module so as to change the distance between the lens module and the image sensor from the initial image distance into the target image distance.

2. The focusing method according to claim 1, an aperture of the first diaphragm being greater than an aperture of the second diaphragm, wherein, in the step of detecting simultaneously light energy of a first spectrum and light energy of a second spectrum, the light energy of the first spectrum corresponds to light energy of a visible light spectrum, and the light energy of the second spectrum corresponds to light energy of an infrared light spectrum.

3. The focusing method according to claim 2, wherein, in the step of generating a control signal,
    the lookup table contains K numbers of different reference image distances, K numbers of threshold values for differences between circle of confusion diameters corresponding respectively to the K numbers of reference image distances, and K numbers of adjustment image distances corresponding respectively to the K numbers of reference image distances, in which K is an integer; and
    each of the threshold values for differences between circle of confusion diameters contained in the lookup table is obtained under a condition that the distance between the lens module and the image sensor is equal to a corresponding one of the reference image distances and that a distance between the object and the lens module is equal to a predetermined object distance.

4. The focusing method according to claim 3, wherein, in the step of generating a control signal, the predetermined object distance is greater than an in-focus object distance, a corresponding difference between circle of confusion diameters is equal to zero when the distance between the object and the lens module is equal to the in-focus object distance and when the distance between the lens module and the image sensor is equal to said corresponding one of the reference image distances.

5. The focusing method according to claim 4, wherein, in the step of generating a control signal, the predetermined object distance is not smaller than twenty-two times the in-focus object distance.

6. The focusing method according to claim 3, wherein the step of generating a control signal includes the sub-steps of:
selecting, by the processor module from the lookup table, a selected one of the K numbers of reference image distances that is equal to the initial image distance;
determining, by the processor module, whether the diameter difference thus calculated is greater than one of the threshold values that corresponds to the selected one of the K numbers of reference image distances;
when it is determined that the diameter difference thus calculated is greater than said one of the threshold values, by the processor module, selecting one of the adjustment image distances that corresponds to the selected one of the K numbers of reference image distances to serve as the target image distance, and generating the control signal according to the target image distance; and
when it is determined that the diameter difference thus calculated is not greater than said one of the threshold values, by the processor module, obtaining contrast of the first image data, determining the target image distance according to the contrast thus obtained, and generating the control signal according to the target image distance.

7. An image capturing device comprising:
an image sensor;
a lens module which is movable relative to said image sensor and which includes a first diaphragm and a second diaphragm different from said first diaphragm;
a storage module which stores a lookup table that contains information of at least one image distance and at least one corresponding difference between circle of confusion diameters;
a focus driver for driving movement of said lens module; and
a processor module which is coupled electrically to said image sensor, said focus driver and said storage module and which controls said driver module; and
wherein said image sensor detects simultaneously light energy of a first spectrum and light energy of a second spectrum which are associated with an image containing an object when said lens module is located at an initial position, for respective generation of a first image data corresponding to the light energy of the first spectrum and a second image data corresponding to the light energy of the second spectrum, each of the first image data and the second image data being associated with a respective one of said first diaphragm and said second diaphragm, a distance between said lens module which is located at the initial position and said image sensor being defined as an initial image distance;
wherein said processor module receives the first image data and the second image data from said image sensor, obtains, according to the first image data and the second image data, a first circle of confusion diameter and a second circle of confusion diameter which are associated with the object and which correspond respectively to the first image data and the second image data, and calculates a diameter difference between the first circle of confusion diameter and the second circle of confusion diameter;
said processor module generates a control signal associated with a target image distance at least according to the initial image distance, the diameter difference and the lookup table, and outputs the control signal to said focus driver, so that said focus driver drives, according to the control signal received from said processor module, movement of said lens module so as to change the distance between said lens module and said image sensor from the initial image distance into the target image distance.

8. The image capturing device according to claim 7, wherein an aperture of said first diaphragm is greater than an aperture of said second diaphragm, the light energy of the first spectrum corresponds to light energy of a visible light spectrum, and the light energy of the second spectrum corresponds to light energy of an infrared light spectrum.

9. The image capturing device according to claim 8, wherein the lookup table stored in said storage module contains K numbers of different reference image distances, K numbers of threshold values for differences between circle of confusion diameters corresponding respectively to the K numbers of reference image distances, and K numbers of adjustment image distances corresponding respectively to the K numbers of reference image distances, in which K is an integer; and
each of the threshold values for differences between circle of confusion diameters contained in the lookup table is obtained under a condition that the distance between said lens module and said image sensor is equal to a corresponding one of the reference image distances and that a distance between the object and the lens module is equal to a predetermined object distance.

10. The image capturing device according to claim 9, wherein the predetermined object distance is greater than an in-focus object distance, a corresponding difference between circle of confusion diameters is equal to zero when the distance between the object and the lens module is equal to the in-focus object distance and when the distance between said lens module and said image sensor is equal to said corresponding one of the reference image distances.

11. The image capturing device according to claim 10, wherein the predetermined object distance is not smaller than twenty-two times the in-focus object distance.

12. The image capturing device according to claim 9, wherein said processor module selects from the lookup table a selected one of the K numbers of reference image distances that is equal to the initial image distance;
said processor module determines whether the diameter difference thus calculated is greater than one of the threshold values that corresponds to the selected one of the K numbers of reference image distances;
when it is determined that the diameter difference thus calculated is greater than said one of the threshold values, said processor module selects one of the adjustment image distances that corresponds to the selected one of the K numbers of reference image distances to serve as the target image distance, and generates the control signal according to the target image distance; and
when it is determined that the diameter difference thus calculated is not greater than said one of the threshold values, said processor module obtains contrast of the first image data, determines the target image distance according to the contrast thus obtained, and generates the control signal according to the target image distance.

\* \* \* \* \*